(12) United States Patent
Lee et al.

(10) Patent No.: US 12,360,201 B2
(45) Date of Patent: Jul. 15, 2025

(54) TIME-FREQUENCY SPREAD WAVEFORM FOR HIGH-RESOLUTION DIGITAL RADAR

(71) Applicant: Aura Intelligent Systems, Inc., Boston, MA (US)

(72) Inventors: Jungah Lee, Boston, MA (US); David C. Munson, Jr., Pittsford, NY (US)

(73) Assignee: Aura Intelligent Systems, Inc., Boston, MA (US)

( * ) Notice: Subject to any disclaimer, the term of this patent is extended or adjusted under 35 U.S.C. 154(b) by 372 days.

(21) Appl. No.: 17/758,879

(22) PCT Filed: Jan. 14, 2021

(86) PCT No.: PCT/US2021/070043
§ 371 (c)(1),
(2) Date: Jul. 14, 2022

(87) PCT Pub. No.: WO2021/146755
PCT Pub. Date: Jul. 22, 2021

(65) Prior Publication Data
US 2023/0033995 A1    Feb. 2, 2023

Related U.S. Application Data

(60) Provisional application No. 62/961,079, filed on Jan. 14, 2020.

(51) Int. Cl.
*G01S 7/288* (2006.01)
*G01S 7/02* (2006.01)
(Continued)

(52) U.S. Cl.
CPC ............ *G01S 7/2883* (2021.05); *G01S 7/023* (2013.01); *G01S 7/356* (2021.05); *H04B 1/713* (2013.01)

(58) Field of Classification Search
CPC ........ G01S 7/2883; G01S 7/356; G01S 7/023; H04B 1/713
See application file for complete search history.

(56) References Cited

U.S. PATENT DOCUMENTS

| 2007/0183386 A1 | 8/2007 | Muharemovic et al. |
| 2014/0177554 A1 | 6/2014 | Kwak et al. |
| (Continued) | | |

FOREIGN PATENT DOCUMENTS

| CN | 101340273 A | 1/2009 |
| CN | 108562883 A | 9/2018 |
| (Continued) | | |

OTHER PUBLICATIONS

International Search Report and Written Opinion issued Apr. 8, 2021 regarding Application No. PCT/US2021/070043, 7 pages.
(Continued)

*Primary Examiner* — Vladimir Magloire
*Assistant Examiner* — Maxine McKenzie Phillips

(57) ABSTRACT

The apparatus includes: a radar circuit including a set of antennas for transmission and reception, a transmitter, a receiver, and a medium access control (MAC) controller. The apparatus further includes a controller operably connected to the radar circuit, the controller configured to identify a discrete Fourier transform (DFT) of a long constant amplitude zero autocorrelation (CAZAC) sequence including multiple segments, identify, via the MAC controller, time-frequency resources for the multiple segments, identify a set of time-frequency sub-channels in the time-frequency resources, and sequentially map each of the multiple segments to each of the set of time-frequency sub-channels. The radar circuit is configured to transmit, via the transmitter, a first signal based on the set of time-frequency sub-channels.

18 Claims, 17 Drawing Sheets

(51) Int. Cl.
*G01S 7/35* (2006.01)
*H04B 1/713* (2011.01)

(56) References Cited

U.S. PATENT DOCUMENTS

| | | |
|---|---|---|
| 2015/0326356 A1 | 11/2015 | Guan et al. |
| 2017/0031004 A1 | 2/2017 | Jales et al. |
| 2017/0150485 A1 | 5/2017 | Hampel et al. |
| 2017/0347270 A1* | 11/2017 | Iouchi .................. H04L 5/0098 |
| 2018/0231655 A1 | 8/2018 | Stark et al. |
| 2018/0249467 A1 | 8/2018 | Zheng et al. |
| 2019/0379882 A1 | 12/2019 | Lee |
| 2020/0003866 A1 | 1/2020 | Bauduin et al. |
| 2020/0007260 A1 | 1/2020 | Axnas et al. |

FOREIGN PATENT DOCUMENTS

| | | |
|---|---|---|
| WO | 2018027909 A1 | 2/2018 |
| WO | 2019241390 A1 | 12/2019 |

OTHER PUBLICATIONS

Long et al., "Advanced technology of high-resolution radar: target detection, tracking, imaging, and recognition", Science China Information Sciences, vol. 62, Apr. 2019, pp. 040301:1-040301:26.
Chinese National Intellectual Property Administration, Notice of Intention to Grant issued Mar. 13, 2024 regarding Application No. 202180016122.8, 7 pages.
Extended European Search Report issued Dec. 19, 2023 regarding Application No. 21740801.2, 5 pages.
Japanese Patent Office, Decision to Grant a Patent issued Oct. 29, 2024 regarding Application No. 2022-543135, 5 pages.

* cited by examiner

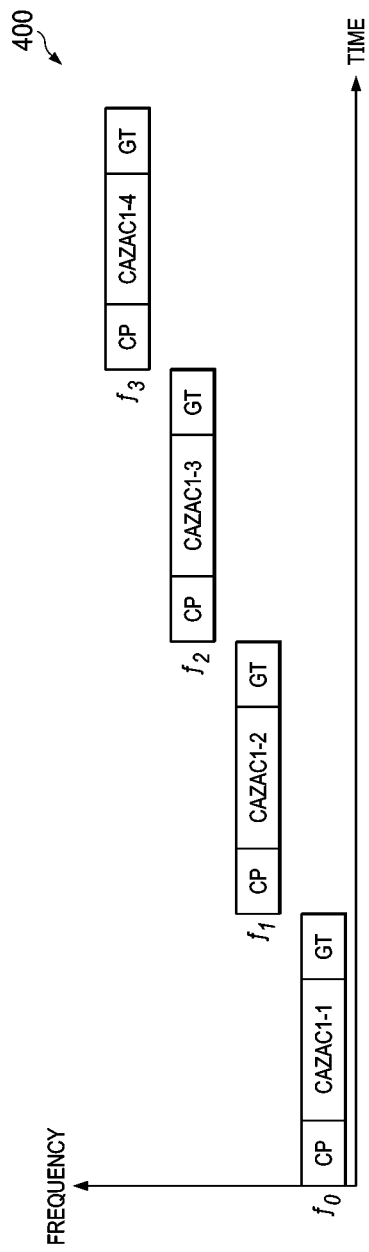
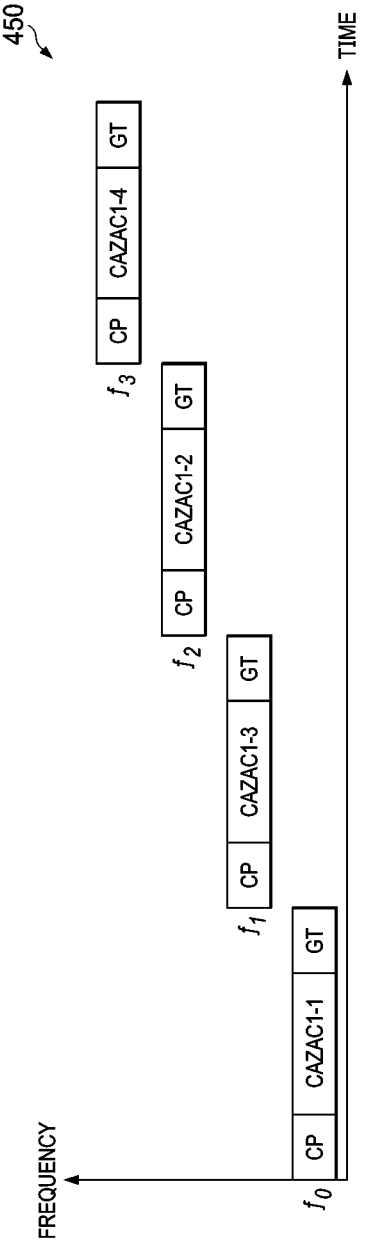
FIG. 4A
FIG. 4B

TIME-FREQUENCY SPREAD WAVEFORM FOR HIGH-RESOLUTION DIGITAL RADAR

CROSS-REFERENCE TO RELATED APPLICATIONS AND CLAIM OF PRIORITY

This application is a 371 National Stage Application of International Application No. PCT/US2021/070043 filed on Jan. 14, 2021, which claims priority to U.S. Provisional Patent Application No. 62/961,079, filed on Jan. 14, 2020, the disclosures of which are herein incorporated by reference in their entirety.

TECHNICAL FIELD

This disclosure generally relates to a digital radar system. More specifically, this disclosure relates to a time-frequency spread waveform for a high-resolution digital radar system.

BACKGROUND

Radars based on digital and/or analog waveforms and a signal processing are emerging in commercial high-resolution sensing applications. Numerous technologies breakthrough occurred, for example frequency modulated continuous-wave (FMCW) radar, chirp radar, and synthetic aperture radar. They have been used in mission-critical applications in military and space for surveillance and/or navigation. From the 1990's, mobile communication technologies saw break-through, resulting in ubiquitous mobile communication coverage and the availability of low-cost mobile devices connecting people in the world. As emerging with $5^{th}$ generation (5G) systems connecting the world, a major paradigm shift is occurring in a communication system. The most important change is connectivity for all things mobile. This in turn will enable automation foreseen by "Industry 4.0" by analyzing massive amount of data generated by "intelligent" sensors, wideband, low-latency 5G connectivity, edge computing, and the management software located in an enterprise data center.

SUMMARY

This disclosure provides systems and methods to produce a time-frequency spread waveform transmission and reception for a high-resolution digital radar system.

In one embodiment, an apparatus of an advanced wireless system is provided, the apparatus comprises a radar circuit including a set of antennas for transmission and reception, a transmitter, a receiver, and a medium access control (MAC) controller. The apparatus further comprises a controller operably connected to the radar circuit, the controller configured to: identify a discrete Fourier transform (DFT) of a long constant amplitude zero autocorrelation (CAZAC) sequence including multiple segments, identify, via the MAC controller, time-frequency resources for the multiple segments, identify a set of time-frequency sub-channels in the time-frequency resources, and sequentially map each of the multiple segments to each of the set of time-frequency sub-channels. The radar circuit is configured to transmit, via the transmitter, a first signal based on the set of time-frequency sub-channels.

In another embodiment, a method of an apparatus of an advanced wireless system is provided. The method comprises: identifying a DFT of a long CAZAC sequence including multiple segments; identifying time-frequency resources for the multiple segments; identifying a set of time-frequency sub-channels in the time-frequency resources; sequentially mapping each of the multiple segments to each of the set of time-frequency sub-channels; and transmitting a first signal based on the set of time-frequency sub-channels.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure, reference is made to the following description, taken in conjunction with the accompanying drawings, in which:

FIGS. 4A, 4B, and 4C illustrate examples of a time-frequency coded OFDM waveform for a long sequence according to embodiments of the present disclosure;

DETAILED DESCRIPTION

FIGS. 1 through 16, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
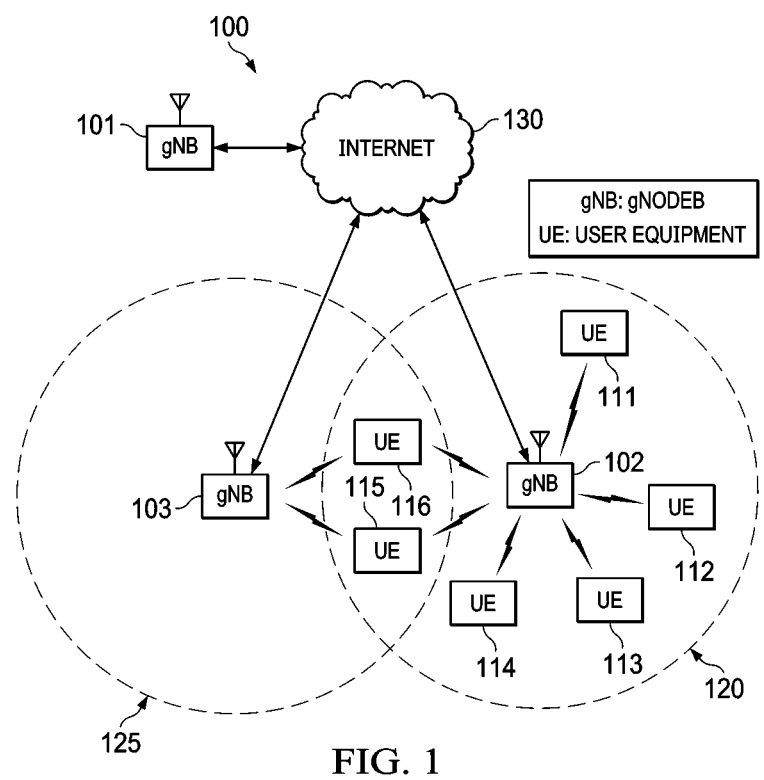
FIG. 1 illustrates an example wireless network according to embodiments of the present disclosure.
Figure 2:
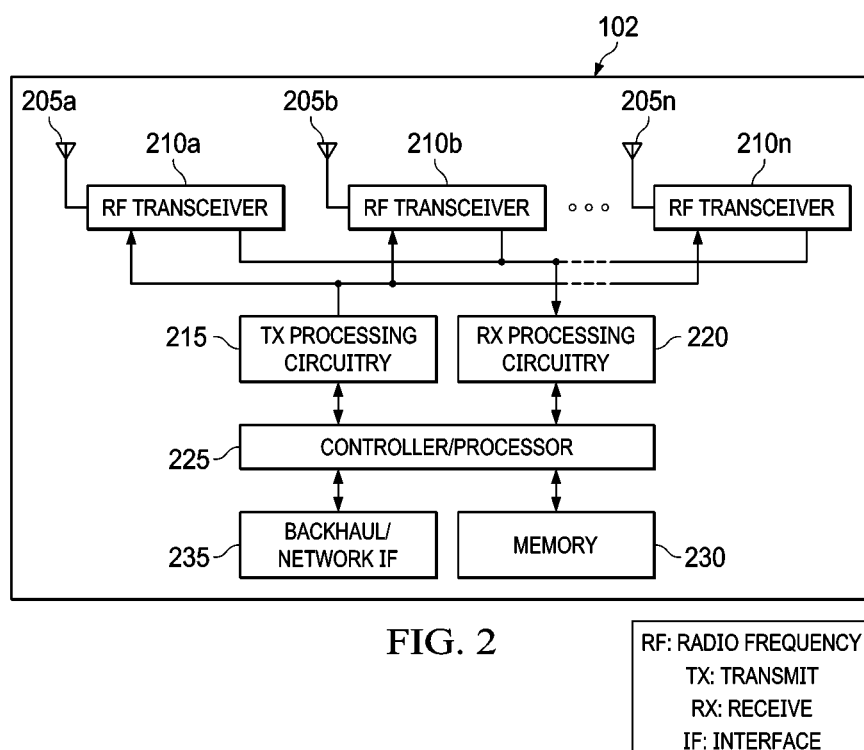
FIG. 2 illustrates an example gNB according to embodiments of the present disclosure.
Figure 3:
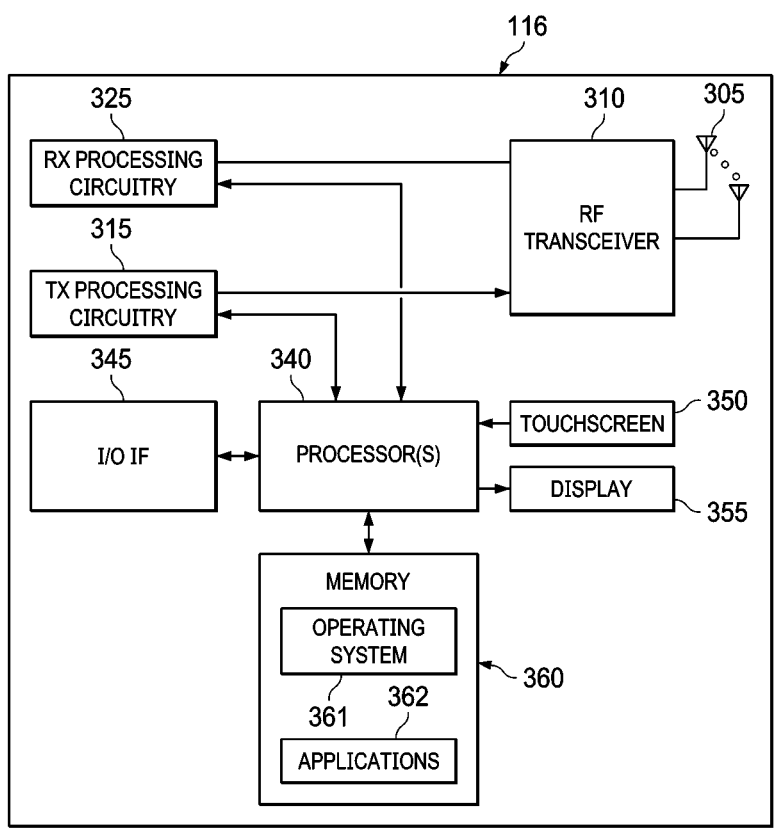
FIG. 3 illustrates an example UE according to embodiments of the present disclosure.

FIGS. 1 through 3 describe various embodiments implemented in wireless communications systems and with the use of orthogonal frequency division multiplexing (OFDM) or orthogonal frequency division multiple access (OFDMA) communication techniques. FIGS. 1 through 3 may employ radar technologies including a digital radar, an analog radar, or a hybrid radar, or their related functionalities or operations. The descriptions of FIGS. 1 through 3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a g NodeB (gNB) 101, a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G base station (gNB), a macrocell, a femtocell, a WiFi access point (AP), or other wirelessly enabled devices. Base stations may provide wireless access in accordance with one or more wireless communication protocols, e.g., 5G 3GPP new radio interface/access (NR), long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for reception reliability for data and control information in an advanced wireless communication system. In certain embodiments, and one or more of the gNBs 101-103 includes circuitry, programing, or a combination thereof, for efficient synthetic aperture antenna array design and beamforming for 3D imaging, localization, and positioning in an advanced wireless system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As illustrated in FIG. 1, the gNB 101, 102, and 103 may employ a radar system, as shown in FIGS. 4 and 5, as one of communication parts (e.g., circuit, module, interface, function etc.) according to embodiment of the present disclosure. In addition, the UE 111 to 116 may employ a radar system including a digital radar system, an analog radar system, or a hybrid radar system, as shown in FIGS. 6, 8, 11, and 15, as one of communication parts (e.g., circuit, module, interface, function etc.) according to embodiment of the present disclosure.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The RF transceivers 210a-210n receive, from the antennas 205a-205n, incoming RF signals, such as signals reflected by UEs or any other objects in the network 100. The RF transceivers 210a-210n down-convert the incoming RF signals to generate IF or baseband signals. The IF or baseband signals are sent to the RX processing circuitry 220, which generates processed baseband signals by filtering, decoding, digitizing the baseband or IF signals and/or decompressing or correlating. The RX processing circuitry 220 sends the processed baseband signals to the controller/processor 225 for further processing.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, the ground station (e.g., access point) could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

Figure 6:
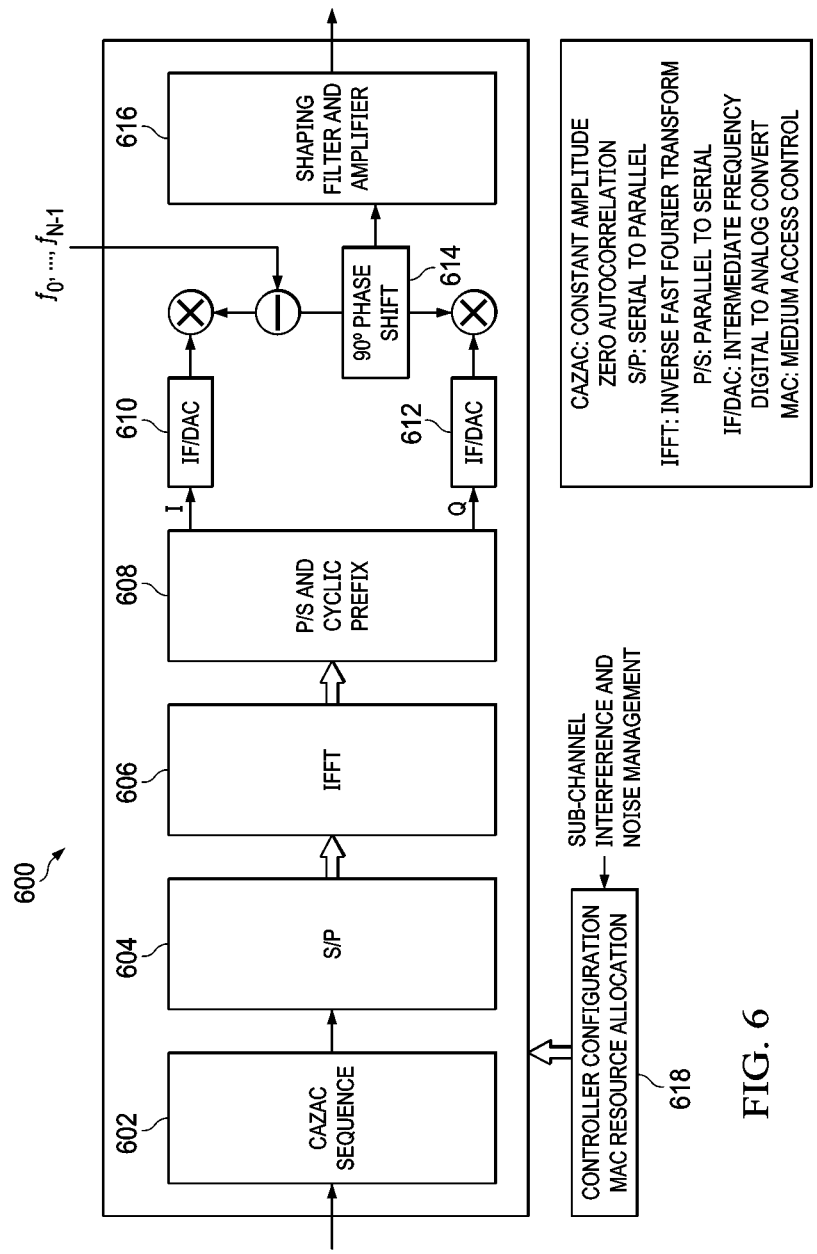
FIG. 6 illustrates an example transmitter for a time-frequency waveform according to embodiments of the present disclosure.
Figure 8:
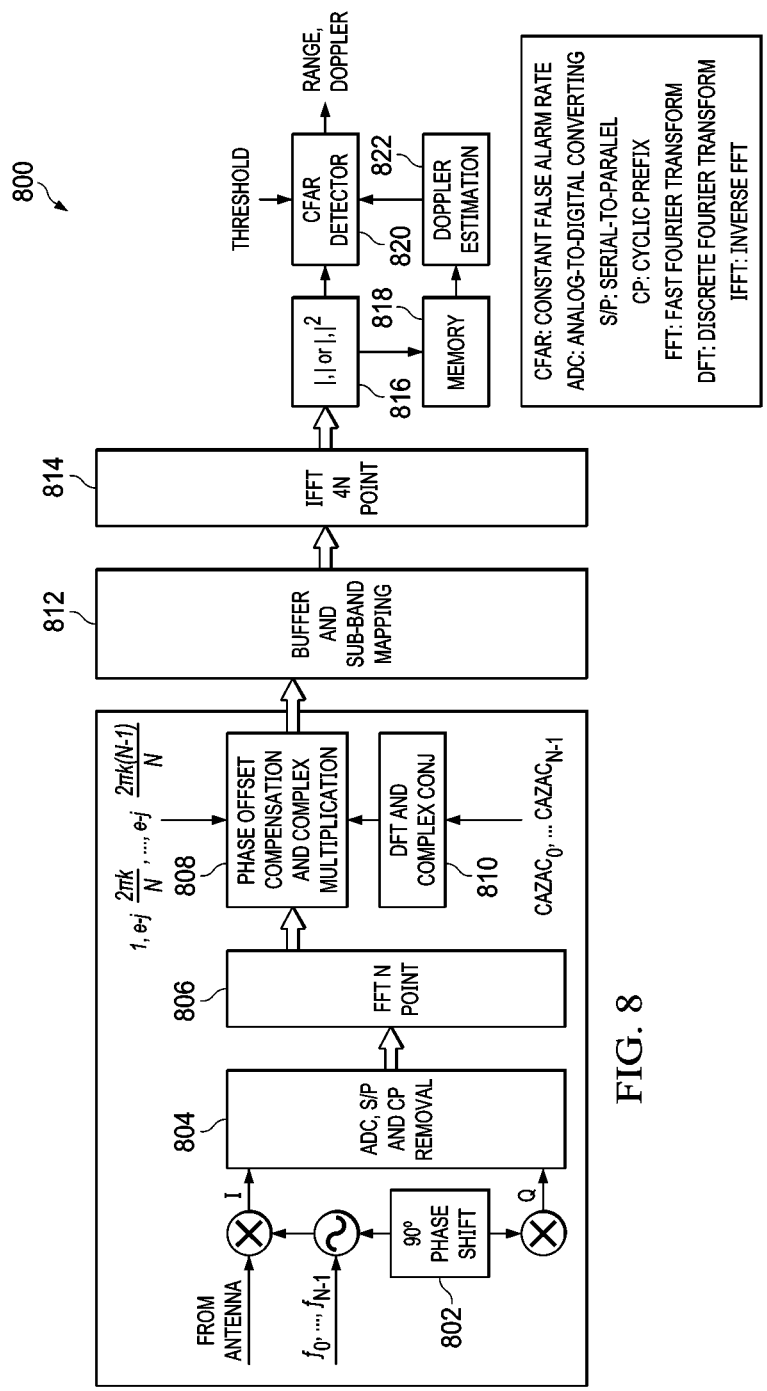
FIG. 8 illustrates an example receiver for a time-frequency waveform according to embodiments of the present disclosure.
Figure 11:
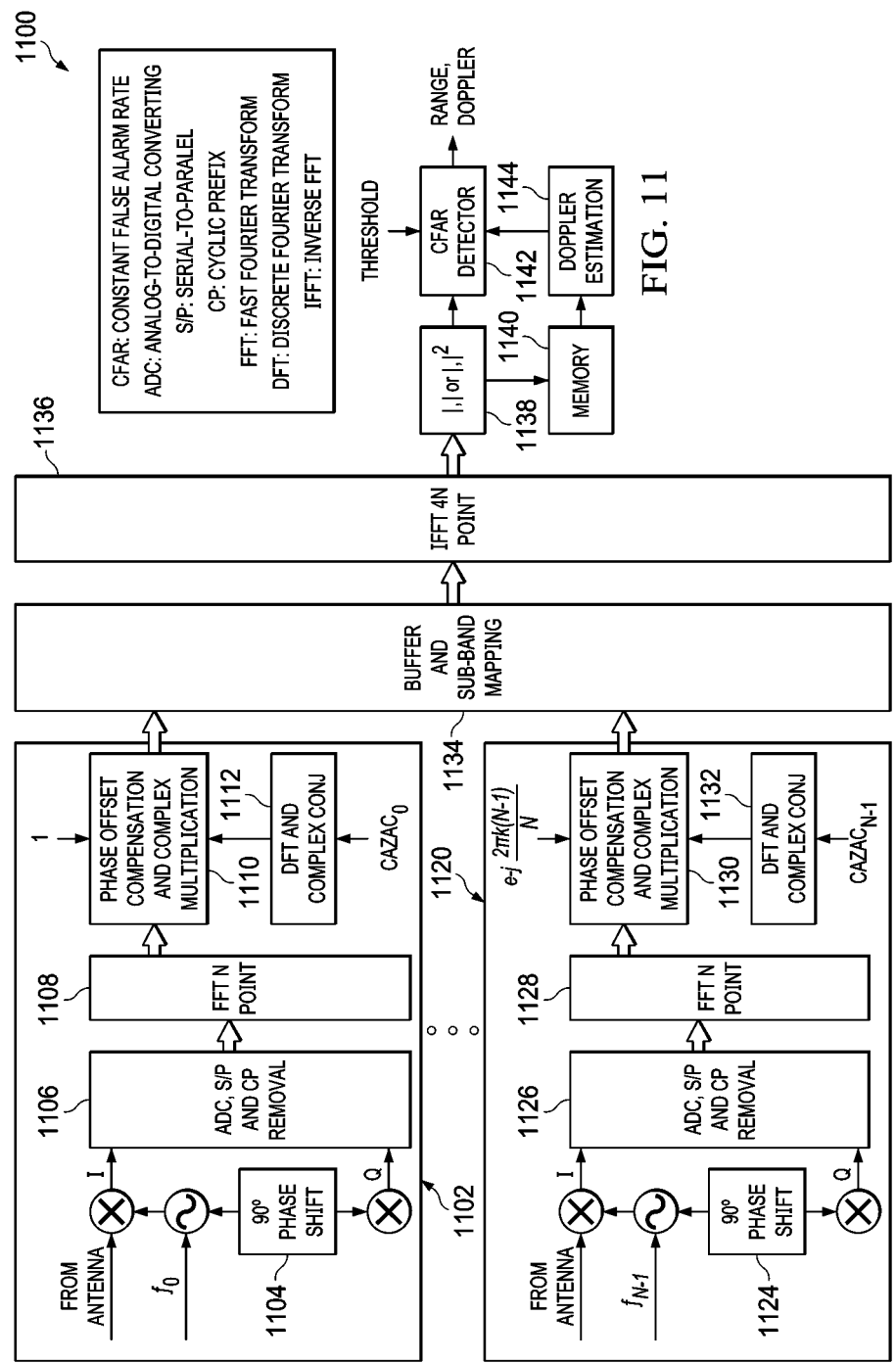
FIG. 11 illustrates an example receiver with range extension according to embodiments of the present disclosure.
Figure 15:
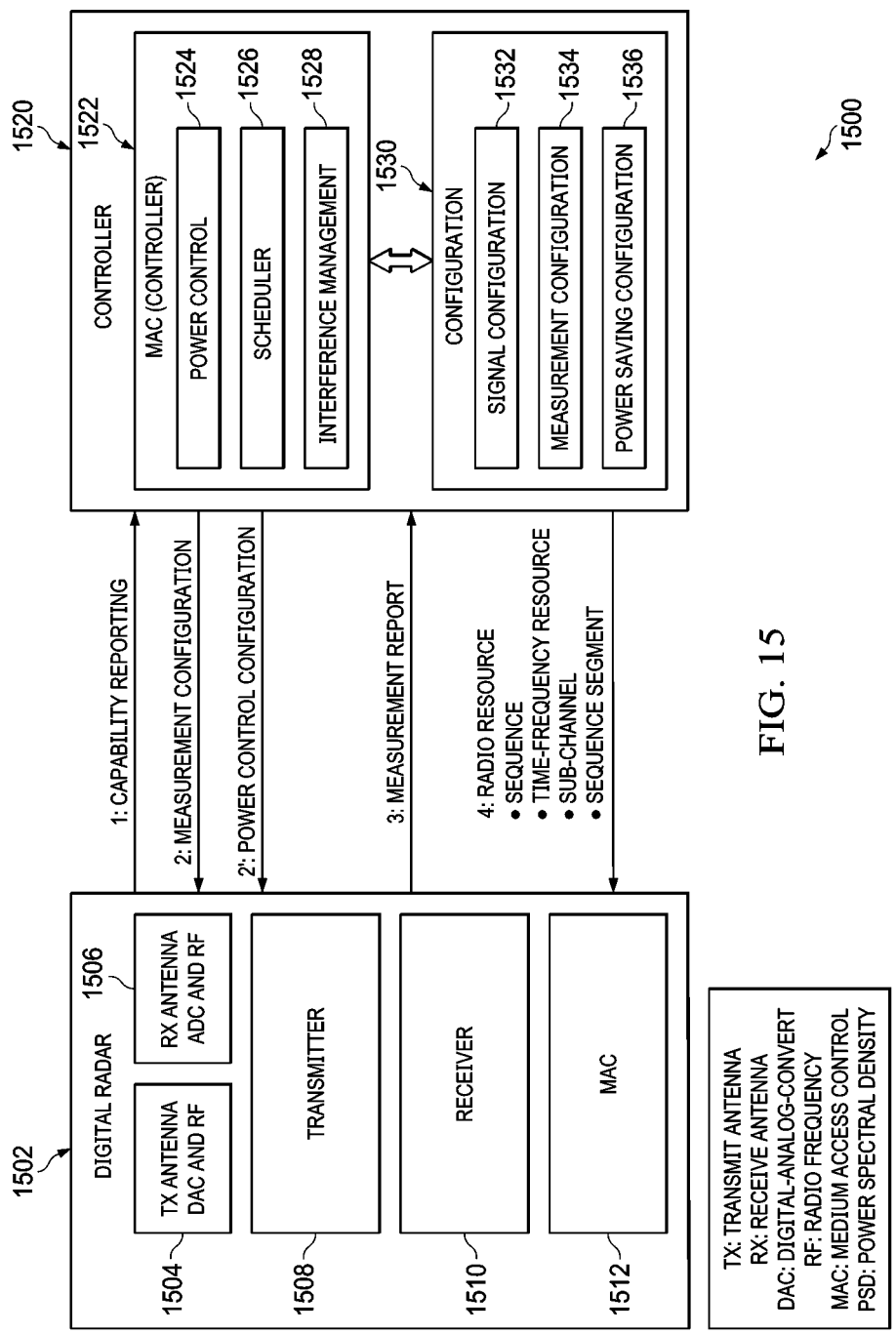
FIG. 15 illustrates an example radar and controller architecture according to embodiments of the present disclosure.

As illustrated in FIG. 2, the gNB 102 may include a radar system as illustrated in FIGS. 6, 8, 11, and 15. The controller 225 may include 1502, 1520 as illustrated in FIG. 15 to control the radar 1502, or controller 1520, 1522 as illustrated in FIG. 15 (as also illustrated in a transmitter 600 of FIG. 6, and receivers of FIGS. 8 and 11). The radar (e.g., digital radar) 1502 of FIG. 15 may be implemented independently and/or coexist with the controller 225 as illustrated in FIG. 2 and/or the processor 340 as illustrated in FIG. 3, in order to control the radar 1502 as illustrated in FIG. 15 and the transmitter 600 as illustrated in FIG. 6 and the receivers 800 as illustrated in FIG. 8, and 1100 as illustrated in FIG. 11.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

An advanced communication apparatus may refer to a transmitter or receiver array in FIGS. 2 and 3 providing hybrid beamforming operation based on all functional blocks, and may be implemented in FIG. 2 as a part of a base station (BS, gNB) or FIG. 3 as a UE.

As shown in FIG. 3, the UE 116 includes an antenna 305, a radio frequency (RF) transceiver 310, TX processing circuitry 315, and receive (RX) processing circuitry 325. The UE 116 also includes a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal and/or decompressing or correlating. The RX processing circuitry 325 transmits the processed baseband signal to the processor 340 for further processing (such as for web browsing data).

The TX processing circuitry 315 receives outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

As illustrated in FIG. 3, the UE 116 may include a radar system as illustrated in FIGS. 6, 8, 11, and 12. The processor 340 may be configured to control the radar system as illustrated in FIGS. 6, 8, 11, and 15.

As illustrated in FIG. 3, the UE 116 may include a radar system as illustrated in FIGS. 6, 8, 11, and 15. The processor 340 may include 1502, 1520 as illustrated in FIG. 15 to control the radar 1502, or controller 1520, 1522 as illustrated in FIG. 15 (as also illustrated in a transmitter 600 of FIG. 6, and receivers 800, 1100 of FIGS. 8 and 11). The radar (e.g., digital radar) 1502 of FIG. 15 may be implemented independently and/or coexist with the controller 225 as illustrated in FIG. 2 and/or the processor 340 as illustrated in FIG. 3, in order to control the radar 1502 as illustrated in FIG. 15 and the transmitter 600 as illustrated in FIG. 6 and the receivers 800 as illustrated in FIGS. 8, and 1100 as illustrated in FIG. 11.

Sensors, in particular radar and Lidar are becoming an integral part of any automation, including automotive safety advanced driver assistance system (ADAS) systems and autonomous vehicle (AV) systems, perimeter security, 5G smart city, intelligent transportation systems, robotics, a remote surgery, and a smart factory. These sensors provide high-resolution and high-performance sensing such as 3-dimensional (3D) images for computer vision. These sensors may provide massive amounts of real-time data and intelligent, providing insights analyzed by machine learning software located at the edge of the network. High-resolution imaging radars are becoming essential for machine perception in all environmental conditions, such as outdoor harsh environment.

A digital radar waveform brings performance that was not imaginable with an analog waveform in machine perception. The waveform is shaped to provide a low sidelobe level, a sharp range, Doppler resolution, and co-channel interference immunity from other radar users and intentional jamming signal.

Major challenge in a high-resolution radar waveform is its implementation complexity. In a frequency-modulated continuous wave (FMCW) radar, a stretch processing is an innovative way to reduce processing bandwidth of the signal. The resolution of range processing is determined by the bandwidth of the signal, which can be multi-GHz. In practical systems, the digital processing is limited by the sampling rate of the analog-to-digital converters (ADCs).

Phase modulation (PM) radars and orthogonal frequency division multiplexing (OFDM) radars based on a wide bandwidth signal would require a wideband and high bit-rate ADC. For high-resolution imaging radars, many RF channels are required, driving the cost and power consumption of the system. Furthermore, a digital signal processing would need to be done at Nyquist rate of the signal, making the receiver processing challenging, even in today's computation technology. OFDM signal generation and processing are challenging due to the wide bandwidth processing required for high-resolution radars. Automotive radars in 76 GHz-81 GHz has signal bandwidth of 1 GHz to 5 GHz, requiring ADC rate exceeding 10 Gsps with large number of bits. For 3D radar imaging requiring 10's to 100's channels, wideband OFDM radar systems are not practical. As such, commercially available radar transceivers rely on FMCW signal.

In the present disclosure, a novel radar with time-frequency waveform design is provided. The waveform is designed in a time and frequency domain allowing narrowband processing of digital waveform segments, reducing the burden on analog-to-digital convert/digital-to-analog convert (ADC/DAC) and the baseband processing requirement. The time-frequency waveform enables narrowband processing for a digital waveform with ADC and receiver processing at a slower speed that is feasible with today's technology. This architecture enables use of digital waveform for large bandwidth applications such as 120 GHz sensing and imaging radar or emerging tera Hertz sensing and imaging applications.

In the context of coded OFDM radar, the provided waveform preserves the resolution and large processing gain of long sequence. The effect is in a sense similar to stretch processing in analog FMCW radar. A time-frequency waveform design in the present disclosure allows flexible coding, retaining the processing gain of the original wideband signal, without range limitations of conventional analog stretch processing.

The present disclosure provides a time-frequency waveform design, efficient digital transmission, and receiver processing. In the present disclosure, a time-frequency coded waveform with aggregation is provided. The time-frequency coded waveform retains the performance benefits of the wideband signal, while reducing the complexity associated with wide bandwidth signal by processing the signal in parallel at low rate and aggregating the processed signal.

The implementation uses successive transmission of narrow bandwidth in stretched time and processing of the narrow bandwidth signals in parallel to recover high resolution range and Doppler reconstruction of the radar signal. The present disclosure comprises some functions and operation blocks. In one example, the present disclosure comprises a time-frequency waveform design, transmission, and reception. In such example, a coded OFDM signal design and transmission in time-frequency resource is provided, for example, signal coding with long and short sequences for varying processing gain sequence is provided and frequency hopping to randomize interference is provided.

In one example, the present disclosure comprises: a receiver processing of sub-channel signal; a processing for normal range and extended range; a time-frequency waveform design and aggregation for contiguous and non-contiguous frequency bands with un-equal bandwidth; a scheduling and configuration of the radar signal in dedicated carriers; and scheduling and configuration of the radar signal in communication system such as 4G/5G/6G and WiFi/WiGig systems.

A time-frequency waveform with aggregation solves the implementation challenge of digital radars: (1) reducing transceiver complexity by reducing DAC/ADC bandwidth and bit width, sampling rate and receiver processing complexity, while retaining the high-resolution of the wide bandwidth signal by coherently processing sub-channels; (2) obtaining processing gain corresponding to the original long sequence is obtained by aggregating sub-channels; (3) scaling to very large bandwidth signal such as in Tera Hz and Lidars by processing of narrow bandwidth signals and achieving high resolution by aggregating sub-channels; and (4) processing a time-frequency waveform that is applicable to contiguous band or non-contiguous spectrum allocation and non-consecutive OFDM symbols for embedding digital radar signals in existing communication spectrum (e.g., in 60 GHz band, 7-9 GHz spectrum is divided into 2 GHz spectrum chunks).

The time-frequency waveform with aggregation would allow range resolution up to 1.7 cm by aggregating the available spectrum. A linear FMCW/chirp signal spanning 9 GHz bandwidth would not fit in 60 GHz spectrum grid, limiting the achievable resolution 7.5 cm.

The time-frequency waveform design enables avoidance and cancellation of narrowband interference and jamming by processing sub-band signals; and received signal from multiple sub-bands can be combined flexibly, depending on the targeted range resolution and operation environments. The signal can be coherently combined for an increased processing gain or non-coherently combined for diversity and robustness.

A sequence is generated from a CAZAC sequence such as Zadoff-Chu or generalized chirp-like (GCL) sequences with a zero-correlation zone, generated from one or several root Zadoff-Chu or GCL sequences. The sequence can be either directly mapped to OFDM symbols or transformed by DFT before mapping to OFDM symbols.

Time-frequency OFDM signal is constructed by encoding each sub-carrier with a CAZAC sequence symbol. DFT of CAZAC sequence is mapped to time-frequency domain. Each coded OFDM signal occupies time-frequency resource, comprising multiple OFDM symbols and multiple frequency resources. Each time-frequency resource may be a "sub-channel."

In the present disclosure, the method and apparatus provide: decomposing wideband waveform signals into a time-frequency waveform based on a sequence of sub-band signals; generating a time-frequency radar waveform based on the decomposed wideband waveform signals; mapping, based on the time-frequency radar waveform, a constant amplitude zero auto-correlation (CAZAC) sequence into orthogonal frequency division multiplexing (OFDM) sub-carriers to generate a first radar signal according to configured contiguous or non-contiguous time-frequency resources; transmitting, to a target object via a transmit antenna of a set of antennas, the first radar signal; and receiving, via a receive antenna of the set of antennas, a second signal that is reflected or backscattered from the target object and aggregating contiguous or non-contiguous time-frequency resources.

FIG. 4A illustrates an example time-frequency coded OFDM waveform for a long sequence 400 according to embodiments of the present disclosure. An embodiment of the time-frequency coded OFDM waveform for a long sequence 400 shown in FIG. 4A is for illustration only.

Specifically, FIG. 4A illustrates an example time-frequency waveform with sequential sequence mapping.

FIG. 4B illustrates an example time-frequency coded OFDM waveform for a long sequence 450 according to embodiments of the present disclosure. An embodiment of the time-frequency coded OFDM waveform for a long sequence 450 shown in FIG. 4B is for illustration only. Specifically, FIG. 4B illustrates an example time-frequency waveform with sequential sequence mapping.

Figure 4C:
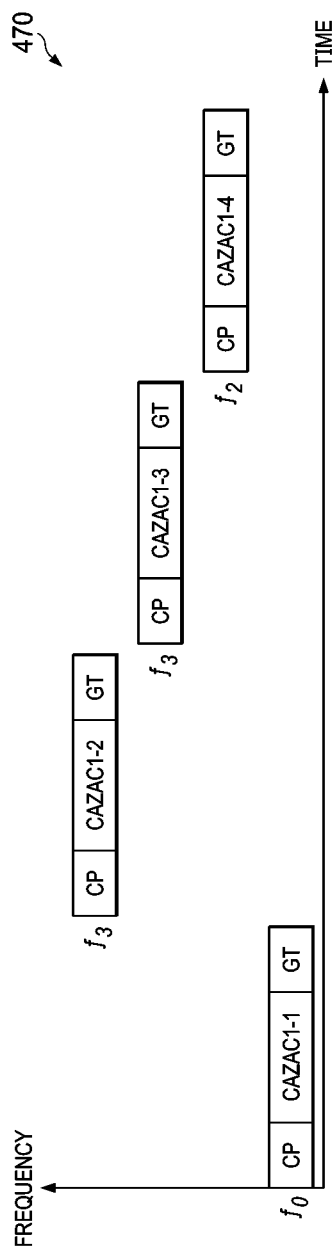

FIG. 4C illustrates an example time-frequency coded OFDM waveform for a long sequence 470 according to embodiments of the present disclosure. An embodiment of the time-frequency coded OFDM waveform for a long sequence 470 shown in FIG. 4C is for illustration only. Specifically, FIG. 4C illustrates an example time-frequency waveform with frequency hopping.

FIGS. 4A, 4B, and 4C illustrate time-frequency waveforms for OFDM radar signal with a long sequence. FIGS. 4A, 4B, and 4C show time-frequency resources with 4 OFDM symbols and 4 sub-bands. In the present disclosure, a time-frequency resource may be a "time-frequency channel." A sequence is divided into 4 segments for transmission within the time-frequency resource. The sub-bands may be contiguous frequency resources or non-contiguous frequency resources, where there is gap between frequency sub-bands.

FIGS. 4A and 4B show coded OFDM waveforms with a sequential sequence mapping. A long CAZAC sequence CAZAC1 is mapped to the time-frequency resources. The CAZAC sequence CAZAC1 is divided into 4 segments denoted as CAZAC1-1 to CAZAC1-4. The first segment of the selected CAZAC sequence CAZAC1-1 is mapped to the first "sub-channel" of time-frequency resource. The second segment of the selected CAZAC sequence CAZAC1-2 is mapped to the second "sub-channel" of time-frequency resource. Similar mapping is applied for the third and fourth sub-channels.

The ordering and mapping of CAZAC sequence segments may be changed within the same time-frequency resource. FIG. 4C shows a coded OFDM waveform with a frequency hopping. A long CAZAC sequence CAZAC1 is mapped to the time-frequency resources. The CAZAC sequence CAZAC1 is divided into 4 segments denoted as CAZAC1-1 to CAZAC1-4. The first segment of the selected CAZAC sequence CAZAC1-1 is mapped to the first "sub-channel" of time-frequency resource. The third segment of the selected CAZAC sequence CAZAC1-3 is mapped to the second "sub-channel" of time-frequency resource. The second segment of the sequence CAZAC1-2 is mapped to the third sub-channel. The fourth segment of the sequence CAZAC1-4 is mapped to the fourth sub-channel. In the next time-frequency channel, the ordering of CAZAC sequences are changed randomly.

The carrier frequency is changed randomly within a time-frequency resource unit. A frequency hopping pattern in shown in FIG. 4C.

Figure 5A:
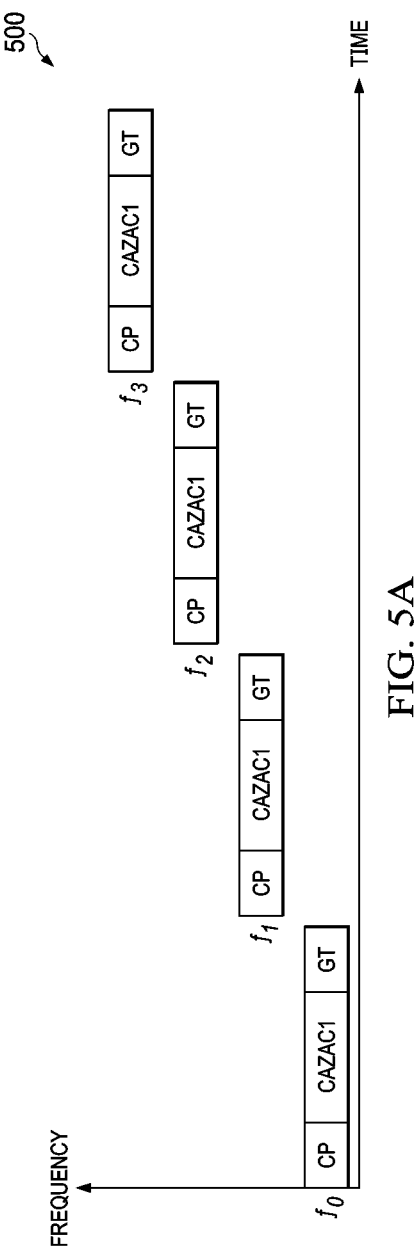
FIGS. 5A, 5B, 5C, and 5D illustrate examples of a time-frequency coded OFDM waveform for a short sequence according to embodiments of the present disclosure.

FIG. 5A illustrates an example time-frequency coded OFDM waveform for a short sequence 500 according to embodiments of the present disclosure. An embodiment of the time-frequency coded OFDM waveform for a short sequence 500 shown in FIG. 5A is for illustration only. Specifically, FIG. 5A illustrates a time-frequency waveform with single sequence mapping.

Figure 5B:
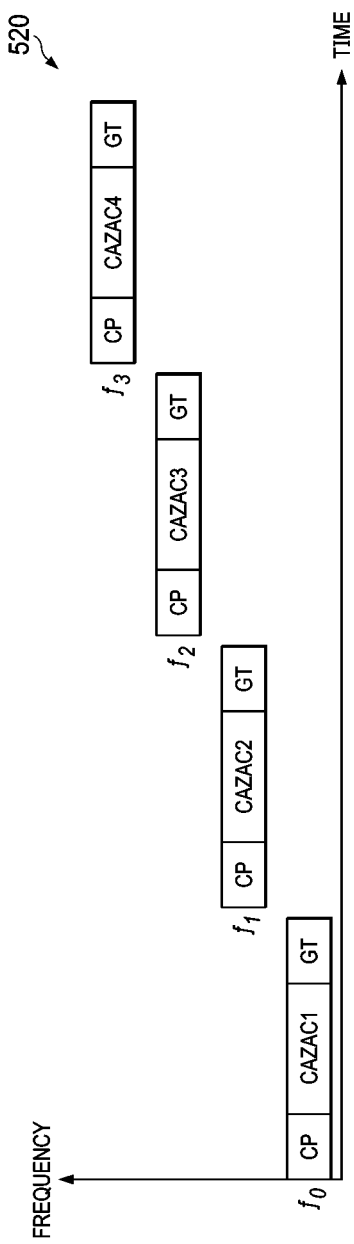

FIG. 5B illustrates an example time-frequency coded OFDM waveform for a short sequence 520 according to embodiments of the present disclosure. An embodiment of the time-frequency coded OFDM waveform for a short sequence 520 shown in FIG. 5B is for illustration only. Specifically, FIG. 5B illustrates a time-frequency waveform with sequential sequence mapping.

Figure 5C:
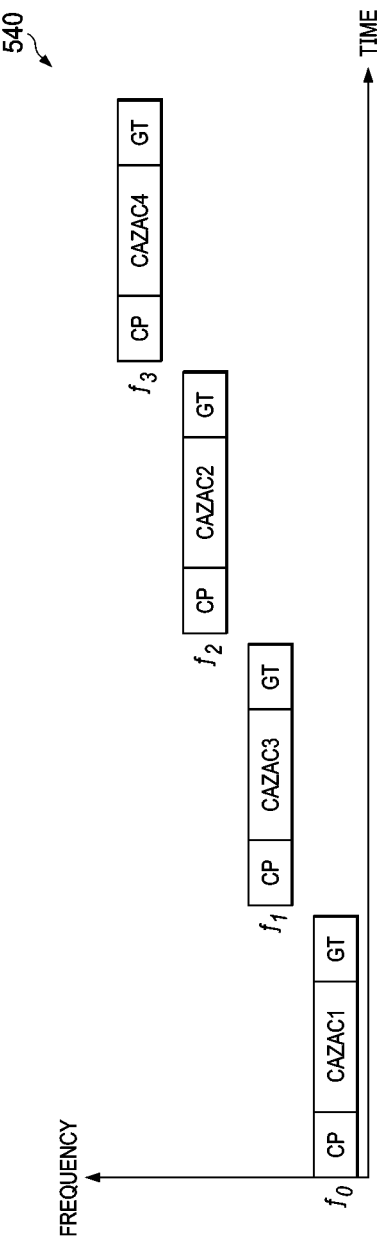

FIG. 5C illustrates an example time-frequency coded OFDM waveform for a short sequence 540 according to embodiments of the present disclosure. An embodiment of the time-frequency coded OFDM waveform for a short sequence 540 shown in FIG. 5C is for illustration only. Specifically, FIG. 5C illustrates a sequence hopping.

Figure 5D:
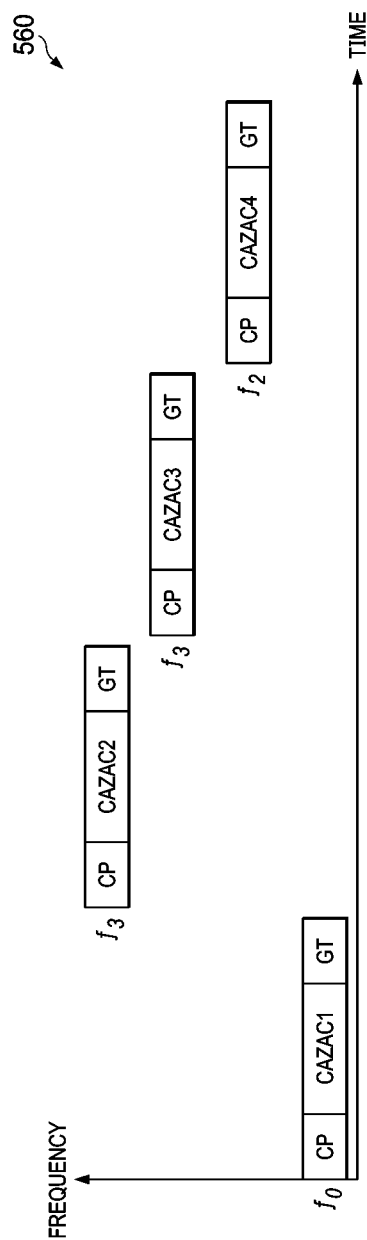

FIG. 5D illustrates an example time-frequency coded OFDM waveform for a short sequence 560 according to embodiments of the present disclosure. An embodiment of the time-frequency coded OFDM waveform for a short sequence 560 shown in FIG. 5D is for illustration only. Specifically, FIG. 5D illustrates a time-frequency waveform with frequency hopping.

FIGS. 5A, 5B, 5C, and 5D illustrate examples time-frequency waveform for OFDM radar signal with a short sequence. FIGS. 5A, 5B, 5C, and 5D show time-frequency resource with 4 OFDM symbols and 4 sub-bands. A short sequence is mapped to each sub-band for each carrier. In the example, 4 root sequences are used as the radar signal.

FIG. 5A shows a coded OFDM waveform with a single sequence mapping. A first CAZAC sequence CAZAC1 is mapped to the time-frequency resource for all OFDM symbols within a time frequency resources.

FIG. 5B shows a coded OFDM waveform with multiple sequence mappings. A first CAZAC sequence CAZAC1 is mapped to the first time-frequency resources. A second segment of the selected CAZAC sequence CAZAC2 is mapped to the second "sub-channel" of time-frequency resource. Similar mapping is applied for the third and fourth sub-channels. The sequence selection is configured by a MAC entity. In the special case, same sequence may be used for the entire time-frequency resource.

The ordering and mapping of CAZAC sequences may be changed within the same time-frequency resource. FIG. 5C shows a coded OFDM waveform with sequence hopping. The first CAZAC sequence CAZAC1 is mapped to the first "sub-channel" of time-frequency resource. The third CAZAC sequence CAZAC3 is mapped to the second "sub-channel" of time-frequency resource. The second CAZAC sequence CAZAC2 is mapped to the third Sub-Channel. The fourth CAZAC sequence CAZAC4 is mapped to the fourth Sub-Channel. In the next time-frequency channel, the ordering of CAZAC sequences are changed again randomly.

The carrier frequency is changed randomly within a time-frequency resource unit. A frequency hopping pattern in shown in FIG. 5D.

FIG. 6 illustrates an example transmitter for a time-frequency waveform 600 according to embodiments of the present disclosure. An embodiment of the transmitter for a time-frequency waveform 600 shown in FIG. 6 is for illustration only. One or more of the components illustrated in FIG. 6 can be implemented in specialized circuitry configured to perform the noted functions or one or more of the components can be implemented by one or more processors executing instructions to perform the noted functions. Other embodiments are used without departing from the scope of the present disclosure.

In one embodiment, the transmitter as illustrated in FIG. 6 may be implemented at a base station (e.g., 101-103 as illustrated in FIG. 1) and/or a UE (e.g., 111-116 as illustrated in FIG. 1).

At each transmission interval, a CAZAC sequence is mapped into a frequency domain, for each carrier frequency. The signal is transformed to a time domain by IFFT, and cyclic-prefix (CP) and guard time (GT) are appended. The I/Q signal is converted to analog domain by DAC and modulated by a carrier frequency before transmission.

RADAR MAC is an entity assigning time-frequency resources of the reference signal. Time-frequency resources are configured based on a targeted range, a transmit power, a beamforming method, and a noise and interference measured at a receiver. The resources can be re-assigned semi-statically or dynamically real-time during operation. The time-frequency channel is configured by the configuration module in the controller. A CAZAC sequence is selected by MAC resource allocation. For each OFDM symbol, one carrier frequency is selected. At next time-frequency resource unit, the modulated symbol(s) modulates another carrier, making up a sub-channel.

In one embodiment, the transmitter architecture for multi-channel coded OFDM system 600 may be implemented at a base station (e.g., 101-103 as illustrated in FIG. 1) or a UE (e.g., 111-116 as illustrated in FIG. 1). The embodiments in 600 generates transmit signal composed of multiple sub-band channels modulating carriers $f_0, \ldots, f_{N-1}$. A CAZAC sequence 602 generates a sub-band CAZAC sequence by DFT pre-coding of a Zadoff-Chu or a GCL sequence. An S/P 604 converts the serial data to parallel stream. An IFFT 606 takes the parallel pre-coded CAZAC sequence and converts the parallel stream of pre-coded CAZAC sequence to time-domain signal. A P/S and cyclic prefix 608 converts the time domain signal to serial stream and adds cyclic-prefix. Optional guard time is added. IF/DACs 610 and 612 take the in-phase and quadrature components of the output of 608 and converts them to analog data in-phase and quadrature signals. A phase shifter 614 takes the output in-phase and quadrature analog signals of the outputs of 608 and 610 and modulates the carrier frequency. In block shaping filter and amplifier (Amp) 616, the modulated carrier is further processed by a shaping filter and amplified and sent to the antenna(s). A MAC controller 618 configures and assigns time-frequency and code resources of the transmitter.

As illustrated in FIG. 6, the circuit 630 includes all components such as 602-618 and circuits 640 and 650 may include the same components as included in the circuit 630. In one embodiment, additional circuitry may be added into the transmitter architecture for multi-channel coded OFDM system 600.

Figure 7:
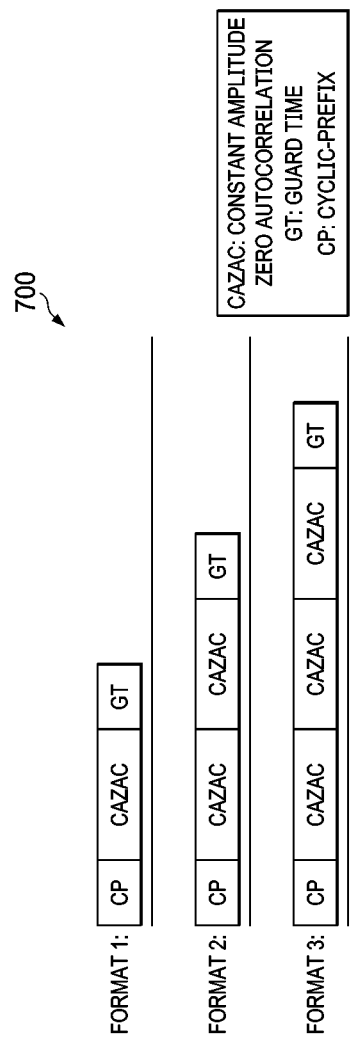
FIG. 7 illustrates an example time-domain signal format according to embodiments of the present disclosure.

FIG. 7 illustrates an example time-domain signal format 700 according to embodiments of the present disclosure. An embodiment of the time-domain signal format 700 shown in FIG. 7 is for illustration only.

FIG. 7 shows the signal structure which may be interpreted to a reference signal. A reference signal is composed of cyclic-prefix (CP), a polyphase sequence, and a guard time (GT). The polyphase sequence is the OFDM waveform generated by taking the IFFT of the time-frequency signal. The GT is added based on a sequence length, and the range of interest for the target scene and the hardware settling time. In Format 1, only one sequence period is shown. When targeting longer range, or in operations involving inclement weather conditions, where high signal degradation is expected, repeated sequence may be used such as Formats 2 and 3.

FIG. 8 illustrates an example receiver for a time-frequency waveform 800 according to embodiments of the present disclosure. An embodiment of the receiver for a time-frequency waveform 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments are used without departing from the scope of the present disclosure.

FIG. 8 shows N sub-channels. For each sub-channel, received signal is down-converted and converted by ADC to digital baseband signal. After CP removal, the received signal is converted to frequency-domain sub-band signals. After OFDM symbol-level phase offset compensation and sub-band mapping to a wideband signal, a range correlation is computed in the frequency domain. This is achieved by multiplication with the complex conjugate of the reference signal. The reference signal is either a short CAZAC sequence or sequences, or in case of long sequence, segments of CAZAC sequences. These reference signals are the original frequency-domain sequences that were transmitted. The correlation output is stored in a memory for Doppler estimation.

In one embodiment, the receiver as illustrated in FIG. 8 may be implemented at a base station (e.g., 101-103 as illustrated in FIG. 1) and/or a UE (e.g., 111-116 as illustrated in FIG. 1).

Detection statistic is formed by taking the amplitude or amplitude square of the correlator output, followed by a CFAR detector, resulting in range and doppler estimates. Depending on targeted maximum range, one or multiple receiver processing chain may be instantiated.

As illustrated in FIG. 8, a signal is processed at a 90 degree phase shift block 802. An output of the 90 degree phase shift block 802 is transmitted to an ADC S/P and CP removal block 804. An output of FFT N point block 806 is transmitted to a phase offset compensation according to the phase compensation factor $$\left(1, e^{-j\frac{2\pi k}{N}}, \ldots, e^{-j\frac{2\pi k(N-1)}{N}}\right)$$

and complex multiplication block 808. An output of DFT and complex conjugate block 804 receiving a reference CAZAC sequences is transmitted to the phase offset compensation and complex multiplication block 808. A buffer and sub-band mapping block 812 receives an output signal of the phase offset compensation and complex multiplication block 808 and transmits an output signal of the phase offset compensation and complex multiplication block 808 to IFFT 4N point block 814. An output of IFFT 4N point block 814 is transmitted to block 816. An output of block 816 is transmitted to a CFAR detector block 820 and memory 818. The memory 818 transmits an output signal to the CFAR detector block 820 through a Doppler estimation block 822.

Figure 9:
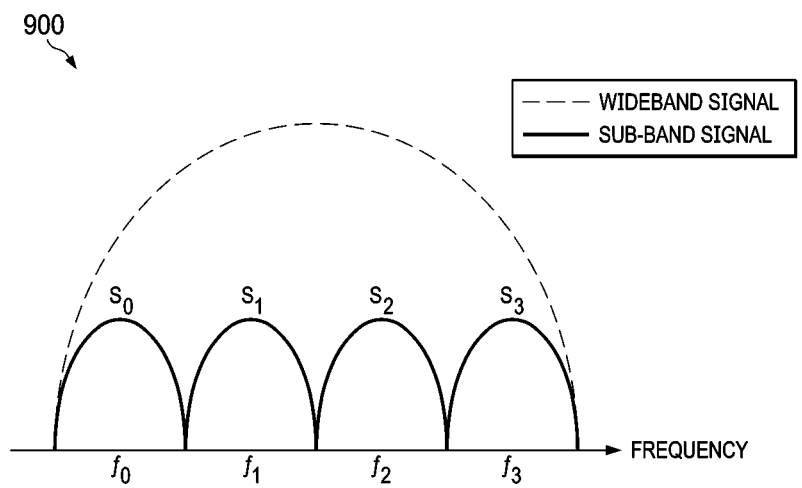
FIG. 9 illustrates an example sub-band to wideband signal mapping according to embodiments of the present disclosure.

By mapping the sequences or sequence segments, a wideband signal is reconstructed. FIG. 9 illustrates an example sub-band to wideband signal mapping 900 according to embodiments of the present disclosure. An embodiment of the sub-band to wideband signal mapping 900 shown in FIG. 9 is for illustration only. FIG. 9 shows the reconstructed wideband signal from multiple sub-band signal.

A conventional OFDM radar would be limited by the length of the signal. With a time-frequency waveform, range extension beyond the OFDM symbol length is achieved, by receiver processing without modification of transmit signal.

Figure 10A:
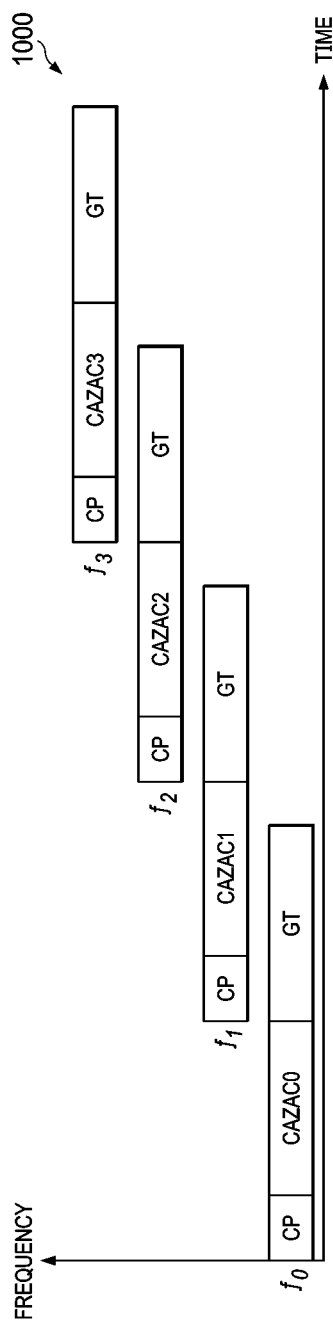
FIGS. 10A and 10B illustrate examples of a time-frequency waveform structure according to embodiments of the present disclosure.

FIG. 10A illustrates an examples time-frequency waveform structure 1000 according to embodiments of the present disclosure. An embodiment of the time-frequency waveform structure 1000 shown in FIG. 10 is for illustration only. Specifically, FIG. 10A illustrates an examples time-frequency waveform structure for a normal range.

Figure 10B:
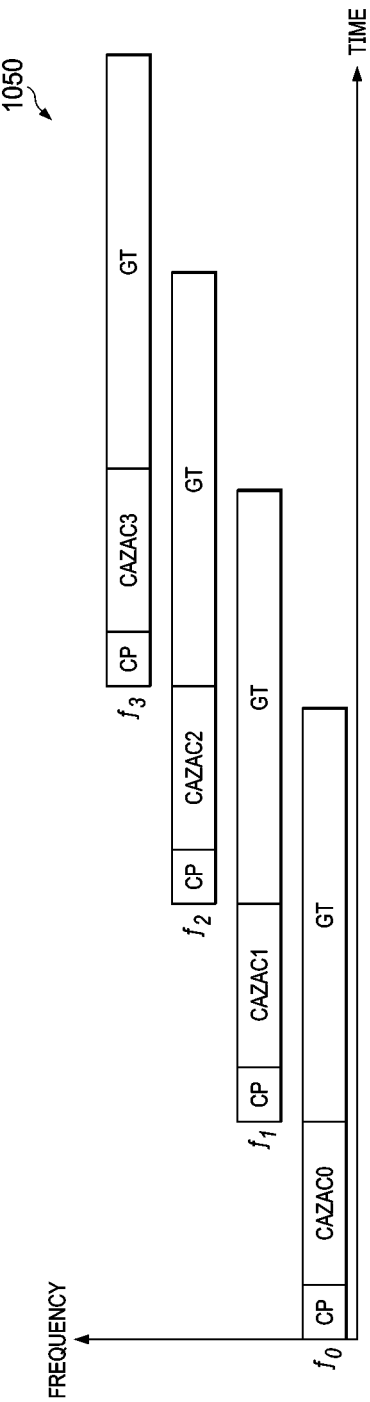

FIG. 10B illustrates an examples time-frequency waveform structure 1050 according to embodiments of the present disclosure. An embodiment of the time-frequency waveform structure 1050 shown in FIG. 10B is for illustration only. Specifically, FIG. 10B illustrates an examples time-frequency waveform structure for an extended range.

FIG. 10A shows the waveform for normal range. In case of normal range, the length of the guard time (GT) is set as the OFDM symbol duration. The maximum range is determined by the duration of the guard time. At the receiver, signal is received up to the GT and sub-channel multiplication is computed.

FIG. 10B shows the waveform for extended range where GT is twice the length of the OFDM symbol. Range is extended by a factor of two. In the receiver, a signal is received up to the extended guard time. In this example, a receiver processing is extended to 3 OFDM symbols.

In a 4-subchannel time-frequency waveform, range extension up to factor of 3 is achieved without increasing the transmit signal time-frequency resource. For a radar signal design having 300 m range, the range extension up to 900 m is achieved by receiver implementation within the same time-frequency resource. Range beyond 900 m is provided by configuring longer guard time.

FIG. 11 illustrates an example receiver with range extension 1100 according to embodiments of the present disclosure. An embodiment of the receiver with range extension 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions. Other embodiments are used without departing from the scope of the present disclosure.

In one embodiment, the receiver architecture with range extension as illustrated in FIG. 11 may be implemented at a base station (e.g., 101-103 as illustrated in FIG. 1) and/or a UE (e.g., 111-116 as illustrated in FIG. 1).

As illustrated in FIG. 11, the receiver 1100 includes two chains of blocks 1102 and 1120. The block 1102 includes a 90 degree phase shift block 1104, an ADC, S/P and CP removal block 1106, an FFT N point block 1108, a phase offset compensation according to the phase compensation factor $$\left(1, e^{-j\frac{2\pi k}{N}}, \ldots, e^{-j\frac{2\pi k(N-1)}{N}}\right)$$

and complex multiplication block 1110, and a DFT and complex conjugate block 1112. Similar to the block 1102, the block 1120 includes a 90 degree phase shift block 1124, an ADC, S/P and CP removal block 1126, an FFT N point block 1128, a phase offset compensation and complex multiplication block 1130, and a DFT and complex conjugate block 1132. Output signals of block 1102 and 1120 are transmitted to buffer and sub-band mapping block 1134. The buffer and sub-band mapping block 1134 transmit an output signal to an IFFT 4N point 1136. An output signal of the IFFT 4N point block 1136 transmits an output signal to a block 1138. The block 1138 transmits an output signal to a memory 1140 and a CFAR detector block 1142. The memory 1140 transmits an output signal to the CFAR detector block 1142 through a Doppler estimation block 1144. Block diagram of the receiver for range extension generalized for N sub-channels is shown in FIG. 8.

A first sub-channel receives and processes a signal for N OFDM symbol periods. Similarly, each receiver continues to receive and processes time-domain signal for N OFDM symbol periods. The entire signal is processed for N OFDM symbols and the peak value is computed, generating range profile for (N−1) OFDM symbol periods. This extends the range by a factor of (N−1). Hardware complexity of the receiver is increased from 2 for normal range to N for range extension.

Depending on spectrum allocation, the available spectrum for radar imaging may be non-contiguous. This arises in existing communication bands and unlicensed 60 GHz spectrum, where a spectrum grid is divided into multiple chunks. For an automotive radar frequency in 76 GHz to 81 GHz, the contiguous spectrum is available. In a V-Band, spanning 57 GHz to 71 GHz, 6 bands each with 2.16 GHz bandwidth is available with 6 frequency grids, with a gap between the sub-bands. A length of the sequences in each sub-channel does not need to be identical. As long as the aggregated bandwidth of the signal are the same, sub-channel bandwidth and the length of the sequence mapped to the sub-channel can be different without affecting the range resolution of the resulting image.

The time-frequency waveform mapping is described below for both contiguous and non-contiguous spectrum allocations.

Figure 12A:
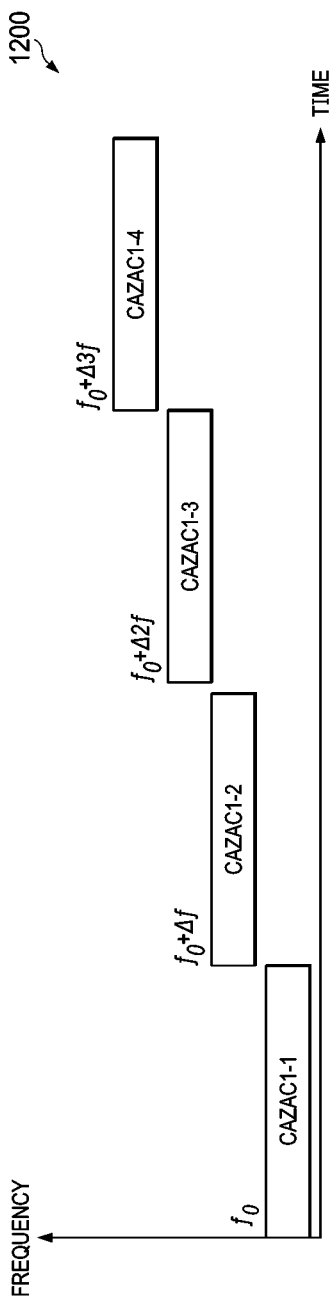
FIGS. 12A and 12B illustrate examples of a time-frequency signal mapping according to embodiments of the present disclosure.

FIG. 12A illustrates an examples time-frequency signal mapping 1200 according to embodiments of the present disclosure. An embodiment of the time-frequency signal mapping 1200 shown in FIG. 12 is for illustration only. Specifically, FIG. 12A illustrates an example time-frequency signal mapping for contiguous sub-band mapping.

Figure 12B:
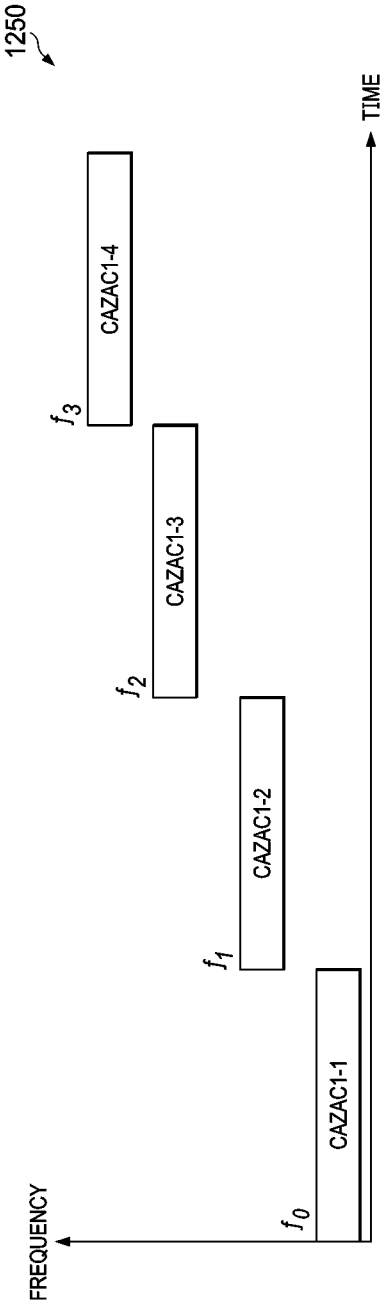

FIG. 12B illustrates an examples time-frequency signal mapping 1250 according to embodiments of the present disclosure. An embodiment of the time-frequency signal mapping 1250 shown in FIG. 12B is for illustration only. Specifically, FIG. 12B illustrates an example time-frequency signal mapping for non-contiguous sub-band mapping.

FIG. 12A shows a time-frequency mapping for a contiguous spectrum, where the difference between the carriers is equal to the bandwidth of the sub-channel, i.e., $\Delta f = f_1 - f_0 = BW$. FIG. 12B shows a time-frequency mapping for a non-contiguous spectrum, where the difference between the carriers is larger than the bandwidth of the sub-channel, i.e., $\Delta f = f_1 - f_0 > BW$.

In one embodiment, for contiguous spectrum, range resolution corresponding to Nyquist sampling rate is obtained in the reconstructed signal.

In one embodiment, for non-contiguous spectrum, range resolution of the reconstructed signal is reduced due to the unused band between the sub-bands.

Figure 13A:
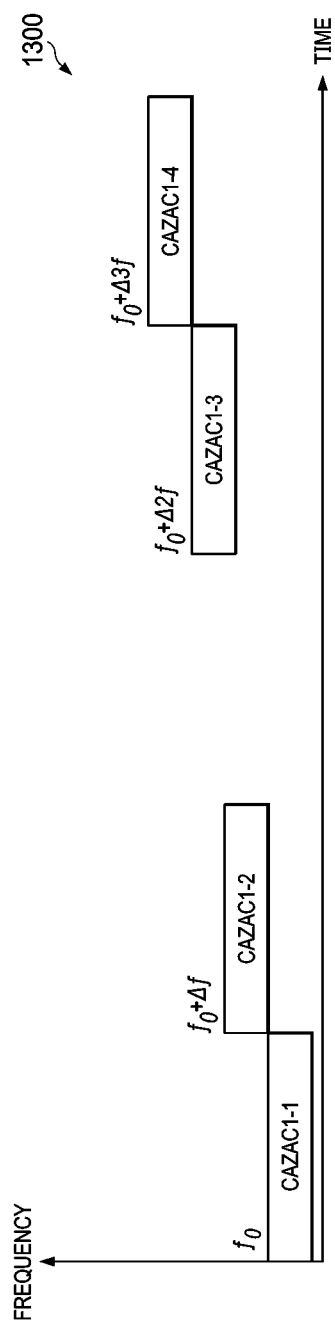
FIGS. 13A and 13B illustrate examples of a time-frequency signal mapping with non-consecutive OFDM symbols according to embodiments of the present disclosure.

FIG. 13A illustrates an example time-frequency signal mapping with non-consecutive OFDM symbols 1300 according to embodiments of the present disclosure. An embodiment of the time-frequency signal mapping with non-consecutive OFDM symbols 1300 shown in FIG. 13A is for illustration only. Specifically, FIG. 13A illustrates an example of the time-frequency signal mapping with non-consecutive OFDM symbols for contiguous sub-band mapping.

Figure 13B:
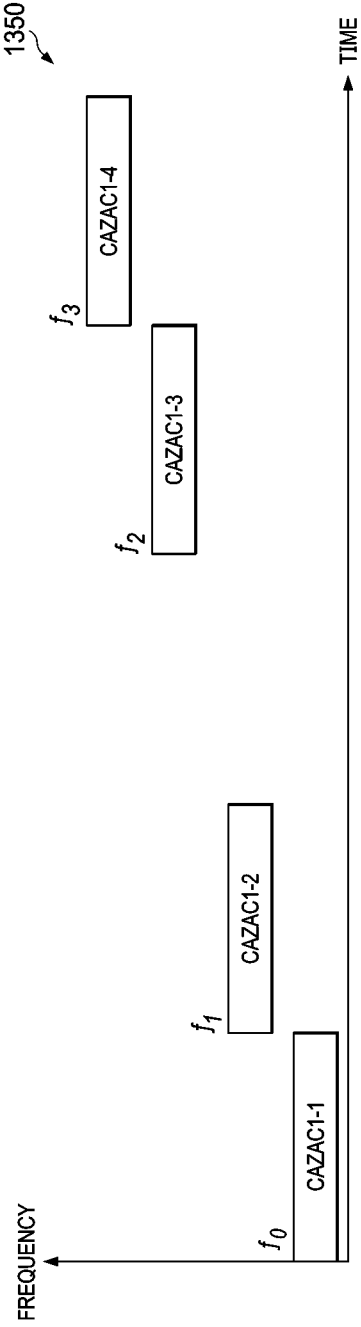

FIG. 13B illustrates an example time-frequency signal mapping with non-consecutive OFDM symbols 1350 according to embodiments of the present disclosure. An embodiment of the time-frequency signal mapping with non-consecutive OFDM symbols 1350 shown in FIG. 13B is for illustration only. Specifically, FIG. 13B illustrates an example of the time-frequency signal mapping with non-consecutive OFDM symbols for non-contiguous sub-band mapping.

As illustrated in FIGS. 13A and 13B, not all OFDM symbols are used for radar signal transmission. FIG. 13A shows a time-frequency mapping for a contiguous spectrum, where $\Delta f = f_1 - f_0$. FIG. 13B shows a time-frequency mapping for a non-contiguous spectrum, where the difference between the carriers is larger than the bandwidth of the sub-channel.

Range resolution of the signals as illustrated in FIGS. 12A and 12B, and FIGS. 13A and 13B are the same. A phase compensation factor corresponding to the OFDM symbol index is applied when computing the correlation in the receiver described in FIG. 8.

Figure 14A:
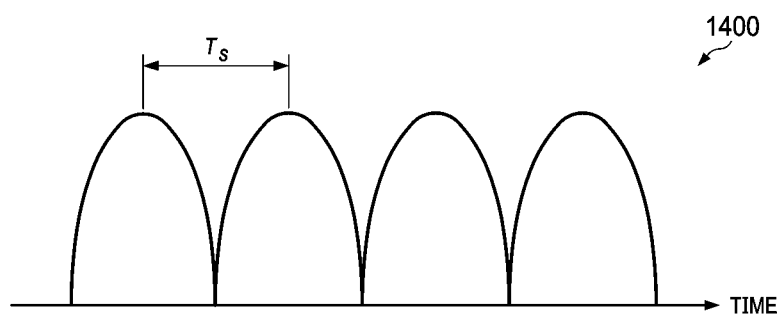
FIGS. 14A and 14B illustrate examples of resolution of reconstructed signal depending according to embodiments of the present disclosure.

FIG. 14A illustrates an example resolution of reconstructed signal 1400 according to embodiments of the present disclosure. An embodiment of the example resolution of reconstructed signal 1400 shown in FIG. 14A is for illustration only.

Figure 14B:
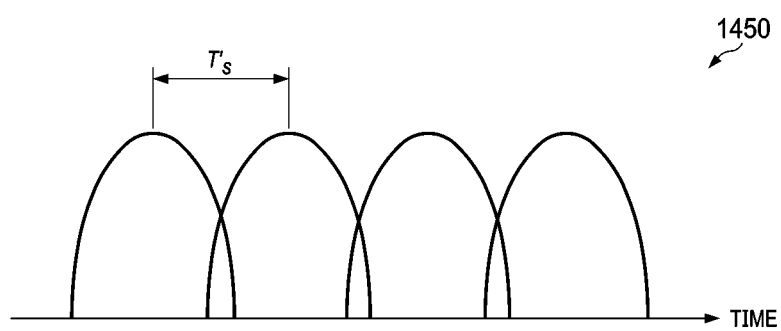

FIG. 14B illustrates an example resolution of reconstructed signal 1450 according to embodiments of the present disclosure. An embodiment of the example resolution of reconstructed signal 1450 shown in FIG. 14B is for illustration only.

FIG. 14A shows the impact of spectrum mapping on the resolution of the signal. If the signal is reconstructed from a full bandwidth such as in contiguous sub-band mapping, a signal is reconstructed at Nyquist rate as illustrated in FIG. 14.

A sample period is $T_s = 1/ABW$ where ABW is the aggregate bandwidth of the signal. For non-contiguous allocation, with the available bandwidth is smaller than the total bandwidth, signal resolution is reduced. Due to sub-Nyquist sampling, aliasing occurs in time (as such in range) domain as shown in FIG. 14B.

FIG. 15 illustrates an example radar and controller architecture 1500 according to embodiments of the present disclosure. An embodiment of radar and controller architecture 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 15, the radar and controller architecture 1500 includes a radar circuit 1502 (e.g., digital radar) and a controller 1520. The digital radar 1502 includes a Tx antenna DAC and RF 1504, an Rx antenna ADC and RF 1506, a transmitter 1508, a receiver 1510, and a MAC 1512. The controller 1520 includes a MAC (controller) 1522 and a configuration block 1530. The MAC (controller) 1522 includes a power control 1524, a scheduler 1526, and interference management 1528. The configuration block 1530 includes a signal configuration block 1532, a measurement configuration block 1534, and a power saving configuration block 1536. The Tx antenna DAC and RF 1504 includes a set of antennas for transmission of signals and the Rx antenna ADC and RF 1506 includes a set of antennas for reception of signals.

A controller has a configuration entity and a medium access control (MAC) entity. The configuration entity is responsible for setting signal configuration, measurement configuration, and power saving configurations. The MAC entity inside the controller is responsible for dynamically managing radio resources and comprises a power control function, a scheduler, and interference management circuits.

A scheduler in a MAC controller determines time-frequency resources and a sequence configuration.

As illustrated in FIG. 15, in one example of Step 1, device capability such as transmit power and maximum RF bandwidth is reported from the digital radar 1502 to the controller 1520. In one example of Step 2, a measurement configuration is sent from the controller 1520 to the digital radar 1502 for such as noise and interference measurements. In one example of Step 2', a power control configuration is sent from the controller 1520 to the digital radar 1502. In one example of Step 3, a measurement result is reported from the digital radar 1502 to the controller 1520. This may be periodic or aperiodic. In one example of Step 4, a MAC configuration block and the scheduler sets a time-frequency channel, a sequence mapping, a long/short sequence selection, a sequence hopping and frequency hopping pattern, and MIMO and beamforming configurations.

In such example, the sequence and the time-frequency resource are determined as follows: the sequence may be fixed throughout the transmission interval; the selected sequence may be changed randomly for each time-frequency channel; and the selected sequence may be scheduled by "scheduler" entity in a radar MAC, depending on noise and interference estimation for each sub-channel Based on the allocated radio resource, radar constructs the signal for transmission.

In 4G, 5G, or WiFi communication system, a scheduler allocates time-frequency resource for a radar signal transmission and reception. Alternatively, a configuration circuit determines the time-frequency resources for radar signal transmission.

Figure 16:
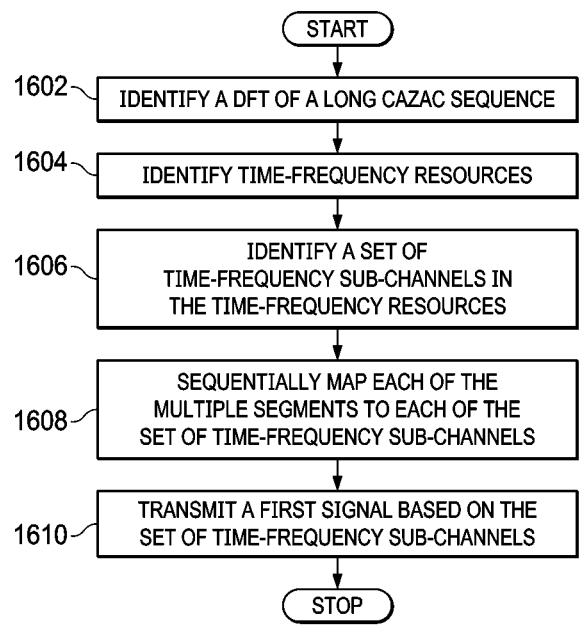
FIG. 16 illustrates a flowchart of a method for a time-frequency spread waveform for high-resolution digital radar according to embodiments of the present disclosure.

FIG. 16 illustrates a flowchart of a method 1600 for a time-frequency spread waveform for high-resolution digital radar according to embodiments of the present disclosure, as may be performed by a UE (e.g., 111-116), a BS (e.g., 101-103), or a stand-alone system, not installed on a UE or base station, such as an individual and independent radar system. An embodiment of method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions. Other embodiments are used without departing from the scope of the present disclosure.

As illustrated in FIG. 16, the method 1600 begins at step 1602. In step 1602, an apparatus identifies a discrete Fourier transform (DFT) of a long constant amplitude zero autocorrelation (CAZAC) sequence including multiple segments.

Subsequently, the apparatus in step 1604 identifies, via a MAC controller, time-frequency resources for the multiple segments.

Subsequently, the apparatus in step 1606 identifies a set of time-frequency sub-channels in the time-frequency resources.

Next, the apparatus in step 1608 sequentially maps each of the multiple segments to each of the set of time-frequency sub-channels.

Finally, the apparatus in step 1610 transmits a first signal based on the set of time-frequency sub-channels.

In one embodiment, the apparatus performs a sequence hopping operation to randomly map each of the multiple segments to each of the set of time-frequency sub-channels and/or performs a frequency hopping operation to map each of the multiple segments to each of the set of time-frequency sub-channels that is randomly selected.

In one embodiment, the apparatus identifies a DFT of a set of short CAZAC sequences and identifies the time-frequency resources for the set of short CAZAC sequences, the time-frequency resources comprising contiguous time-frequency resources or non-contiguous time-frequency resources in a time-frequency domain.

In one embodiment, the apparatus identifies the set of time-frequency sub-channels in the time-frequency resources and sequentially maps each of the set of short CAZAC sequences to each of the set of time-frequency sub-channels.

In one embodiment, the apparatus performs a sequence hopping operation to randomly map each of the set of short CAZAC sequences to each of the set of time-frequency sub-channels and/or performs a frequency hopping operation to map each of the set of short CAZAC sequences to each of the set of time-frequency sub-channels that is randomly selected.

In one embodiment, the apparatus receives a second signal in one of multiple guard symbol periods, the second signal being a reflected signal of the first signal, performs a frequency domain conversion operation for the second signal, and performs a phase offset compensation operation for the frequency domain converted second signal, the phase offset compensation operation corresponding to the set of time-frequency sub-channels in a frequency domain.

In one embodiment, the apparatus performs the phase offset compensation operation for the second signal in a time domain before performing a fast Fourier transform (FFT) operation or during a computation operation of the FFT operation.

In such embodiments, the time-frequency resources comprise contiguous time-frequency resources and non-contiguous time-frequency resources in a time-frequency domain.

In such embodiments, radio resources are configured by a medium access control (MAC) controller for a transmitter to transmit the first signal.

In such embodiment, the radio resources include: sequence information comprising CAZAC sequence, time-frequency resource information comprising contiguous time-frequency resources and non-contiguous time-frequency resources, sub-channel information comprising the set of time-frequency sub-channels in the time-frequency resources, and sequence segment information comprising the multiple segments included in the CAZAC sequence.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the scope of this disclosure, as defined by the following claims.

What is claimed is:

1. An apparatus of an advanced wireless system, the apparatus comprises:
   a radar circuit including a set of antennas for transmission and reception, a transmitter, a receiver, and a medium access control (MAC) controller; and
   a controller operably connected to the radar circuit, the controller configured to:
     identify a discrete Fourier transform (DFT) of a long constant amplitude zero autocorrelation (CAZAC) sequence including multiple segments,
     identify, via the MAC controller, time-frequency resources for the multiple segments, wherein the time-frequency resources comprise, in a time-frequency domain, contiguous time-frequency resources and non-contiguous time-frequency resources,
     identify a set of time-frequency sub-channels in the time-frequency resources, and
     sequentially map each of the multiple segments to each of the set of time-frequency sub-channels,
   wherein the radar circuit is configured to transmit, via the transmitter, a first signal based on the set of time-frequency sub-channels.

2. The apparatus of claim 1, wherein the controller is further configured to:
   perform a sequence hopping operation to randomly map each of the multiple segments to each of the set of time-frequency sub-channels; or
   perform a frequency hopping operation to map each of the multiple segments to each of the set of time-frequency sub-channels that is randomly selected.

3. The apparatus of claim 1, wherein the controller is further configured to:
   identify a DFT of a set of short CAZAC sequences; and
   identify, via the MAC controller, the time-frequency resources for the set of short CAZAC sequences, the time-frequency resources comprising contiguous time-frequency resources or non-contiguous time-frequency resources in a time-frequency domain.

4. The apparatus of claim 3, wherein the controller is further configured to:
identify the set of time-frequency sub-channels in the time-frequency resources; and
sequentially map each of the set of short CAZAC sequences to each of the set of time-frequency sub-channels.

5. The apparatus of claim 4, wherein the controller is further configured to:
perform a sequence hopping operation to randomly map each of the set of short CAZAC sequences to each of the set of time-frequency sub-channels; or
perform a frequency hopping operation to map each of the set of short CAZAC sequences to each of the set of time-frequency sub-channels that is randomly selected.

6. The apparatus of claim 1, wherein:
the radar circuit is further configured to receive, via the receiver, a second signal in one of multiple guard symbol periods, the second signal being a reflected signal of the first signal; and
the controller is further configured to:
perform a frequency domain conversion operation for the second signal, and
perform a phase offset compensation operation for the frequency domain converted second signal, the phase offset compensation operation corresponding to the set of time-frequency sub-channels in a frequency domain.

7. The apparatus of claim 6, wherein the controller is further configured to perform the phase offset compensation operation for the second signal in a time domain before performing a fast Fourier transform (FFT) operation or during a computation operation of the FFT operation.

8. The apparatus of claim 1, wherein the MAC controller is configured to configure radio resources for the transmitter included in the radar circuit.

9. The apparatus of claim 8, wherein the radio resources include:
sequence information comprising CAZAC sequence;
time-frequency resource information comprising contiguous time-frequency resources and non-contiguous time-frequency resources;
sub-channel information comprising the set of time-frequency sub-channels in the time-frequency resources; and
sequence segment information comprising the multiple segments included in the CAZAC sequence.

10. A method of an apparatus of an advanced wireless system, the method comprises:
identifying a discrete Fourier transform (DFT) of a long constant amplitude zero autocorrelation (CAZAC) sequence including multiple segments;
identifying time-frequency resources for the multiple segments, wherein the time-frequency resources comprise, in a time-frequency domain, contiguous time-frequency resources and non-contiguous time-frequency resources;
identifying a set of time-frequency sub-channels in the time-frequency resources;

sequentially mapping each of the multiple segments to each of the set of time-frequency sub-channels; and
transmitting a first signal based on the set of time-frequency sub-channels.

11. The method of claim 10, further comprising:
performing a sequence hopping operation to randomly map each of the multiple segments to each of the set of time-frequency sub-channels; or
performing a frequency hopping operation to map each of the multiple segments to each of the set of time-frequency sub-channels that is randomly selected.

12. The method of claim 10, further comprising:
identifying a DFT of a set of short CAZAC sequences; and
identifying the time-frequency resources for the set of short CAZAC sequences, the time-frequency resources comprising contiguous time-frequency resources or non-contiguous time-frequency resources in a time-frequency domain.

13. The method of claim 12, further comprising:
identifying the set of time-frequency sub-channels in the time-frequency resources; and
sequentially mapping each of the set of short CAZAC sequences to each of the set of time-frequency sub-channels.

14. The method of claim 13, further comprising:
performing a sequence hopping operation to randomly map each of the set of short CAZAC sequences to each of the set of time-frequency sub-channels; or
performing a frequency hopping operation to map each of the set of short CAZAC sequences to each of the set of time-frequency sub-channels that is randomly selected.

15. The method of claim 10, further comprising:
receiving a second signal in one of multiple guard symbol periods, the second signal being a reflected signal of the first signal;
performing a frequency domain conversion operation for the second signal; and
performing a phase offset compensation operation for the frequency domain converted second signal, the phase offset compensation operation corresponding to the set of time-frequency sub-channels in a frequency domain.

16. The method of claim 15, further comprising performing the phase offset compensation operation for the second signal in a time domain before performing a fast Fourier transform (FFT) operation or during a computation operation of the FFT operation.

17. The method of claim 10, wherein radio resources are configured by a medium access control (MAC) controller for a transmitter to transmit the first signal.

18. The method of claim 17, wherein the radio resources include:
sequence information comprising CAZAC sequence;
time-frequency resource information comprising contiguous time-frequency resources and non-contiguous time-frequency resources;
sub-channel information comprising the set of time-frequency sub-channels in the time-frequency resources; and
sequence segment information comprising the multiple segments included in the CAZAC sequence.

* * * * *